(12) United States Patent
Ishizuka

(10) Patent No.: US 8,742,322 B2
(45) Date of Patent: Jun. 3, 2014

(54) ENCODER AND INTERFEROMETER THAT GENERATE M-PHASE SIGNALS BY MULTIPLYING N-PHASE SIGNALS BY M COEFFICIENT SETS, WHERE N IS NOT LESS THAN 6 AND M IS NOT SMALLER THAN 2

(75) Inventor: Ko Ishizuka, Saitama (JP)

(73) Assignee: Canon Kabushiki Kaisha (JP)

( * ) Notice: Subject to any disclaimer, the term of this patent is extended or adjusted under 35 U.S.C. 154(b) by 451 days.

(21) Appl. No.: 13/038,597

(22) Filed: Mar. 2, 2011

(65) Prior Publication Data

US 2011/0220780 A1    Sep. 15, 2011

(30) Foreign Application Priority Data

Mar. 10, 2010    (JP) ................ 2010-052652

(51) Int. Cl.
*G01D 5/34*    (2006.01)
*G01D 5/36*    (2006.01)
*G01B 11/14*    (2006.01)

(52) U.S. Cl.
USPC .............. 250/231.16; 250/237 G; 356/615; 356/616

(58) Field of Classification Search
USPC .............. 250/237 R, 237 G, 231.1, 231.14, 250/231.11, 231.13, 231.16, 231.18, 216, 250/214 R, 214 A; 341/11, 13, 14; 33/1 PT, 33/1 N, 1 M; 356/614, 615, 616, 618, 619, 356/499
See application file for complete search history.

(56) References Cited

U.S. PATENT DOCUMENTS

| 4,595,991 | A | * | 6/1986 | Spies | 33/12 |
| 5,559,599 | A | * | 9/1996 | Michel | 356/499 |
| 5,572,019 | A | * | 11/1996 | Sakuma | 250/231.16 |
| 6,803,560 | B1 | * | 10/2004 | Okumura et al. | 250/231.16 |
| 2003/0047673 | A1 | * | 3/2003 | Thorburn et al. | 250/231.13 |

FOREIGN PATENT DOCUMENTS

| JP | 63-157016 A | | 6/1988 | |
| JP | 63157016 A | * | 6/1988 | G01D 5/34 |
| JP | 03-128418 A | | 5/1991 | |
| JP | 2003279382 A | * | 10/2003 | G01D 5/38 |
| JP | 2005-207822 A | | 8/2005 | |
| JP | 2005-524050 A | | 8/2005 | |

OTHER PUBLICATIONS

Extended European Search Report issued Aug. 5, 2011 for corresponding European Patent Application No. 11157257.4.
Japanese Office Action for corresponding JP 2010-052652, dated Nov. 19, 2013.

* cited by examiner

*Primary Examiner* — Pascal M Bui Pho
*Assistant Examiner* — Jennifer Bennett
(74) *Attorney, Agent, or Firm* — Rossi, Kimms & McDowell LLP

(57) ABSTRACT

The laminated diffractive optical element includes plural diffraction gratings (21, 22 and 23) laminated with each other, the respective diffraction gratings being formed of a same light-transmissive material. In the element, reflective films are formed on grating surfaces (11 and 12) of the respective diffraction gratings, each of the reflective films being disposed between the diffraction gratings. Each of the reflective films reflects light in a specific wavelength range and transmits light in a wavelength range different from the specific wavelength range, the specific wavelength ranges of the respective reflective films being different from each other. The grating surfaces of the respective diffraction gratings are formed in shapes different from each other according to the specific wavelength ranges corresponding to the respective reflective films.

17 Claims, 8 Drawing Sheets

ENCODER AND INTERFEROMETER THAT GENERATE M-PHASE SIGNALS BY MULTIPLYING N-PHASE SIGNALS BY M COEFFICIENT SETS, WHERE N IS NOT LESS THAN 6 AND M IS NOT SMALLER THAN 2

BACKGROUND OF THE INVENTION

1. Field of the Invention

The present invention relates to an optical encoder.

2. Description of the Related Art

Japanese Patent Laid-Open No. 2005-207822 discloses an optical encoder in which a light is illuminated from a light source onto a movable transmission slit to enter a light-receiving element array while being periodically cut off by the transmission slit. Although a light-and-dark distribution is generated at a pitch of slit on the light-receiving element array, it has a complicated waveform that contains a harmonic component such as a triangular wave shape or a trapezoidal shape by the influence of a diffraction of the slit.

When the light-and-dark distribution light having the complicated waveform containing the harmonic component is detected by four-phase light-receiving elements to be converted into A-phase and B-phase differential signals to observe a Lissajous waveform using an oscilloscope or the like, a waveform that has not a circular shape is obtained. Particularly, due to an amount and a phase of a 3rd order harmonic component, the Lissajous waveform becomes the trapezoidal shape or the triangular shape. Periodic signals of the encoder, treated as two-phase sine wave and cosine wave signals (A-phase and B-phase signals), are used for calculating arctangent of the A-phase and B-phase signals. However, if the Lissajous waveform is not the circular shape (there are a lot of distortions in the A-phase and B-phase signals), a measurement error occurs.

Japanese Patent Laid-Open No. H03-128418 discloses a configuration of correcting a shape of a light-emitting region using a mask to bring the waveform of the light-and-dark distribution illuminated on a light-receiving element array closer to a sine wave. However, the state of the light-and-dark distribution varies in accordance with parameters such as a spread of a wavelength, a method of illuminating a light from a light source, a state of an edge of a slit, a distance between the slit and the light-receiving element, and the like, as well as the size or the shape of the light-emitting region of the light source. Therefore, particularly, in an environment where a state of the distance between the slit and the light-receiving element varies, a stable correction was difficult.

Thus, since errors of amplitude, an offset, a phase, and a harmonic distortion are contained in an encoder signal or an interference measurement apparatus, a signal correction is necessary in order to perform a high-precision measurement. Particularly, in a case of a slit transmission encoder or an interference fringe projection encoder, a harmonic distortion component significantly varies due to a gap variation between the scale and the light-receiving element. Therefore, the high-precision measurement by interpolation was difficult. The technology that removes the harmonic distortion contained in a sine wave signal has also been requested in a field of the Michelson interfering measurement apparatus.

SUMMARY OF THE INVENTION

The present invention provides an optical encoder that has an advantage in terms of high precision.

An optical encoder as one aspect of the present invention includes a grating scale configured to be movable, a light-receiving device configured to receive a light via the grating scale irradiated with a light, to generate N-phase signals (N is an integer not smaller than 6) that have respective phases different from each other, and an amplifier configured to multiply the generated N-phase signals by M coefficient sets that are different from each other (M is an integer not smaller than 2), respectively, and to obtain a sum of the multiplied values with respect to each of the M coefficient sets to generate M-phase signals.

Further features and aspects of the present invention will become apparent from the following description of exemplary embodiments with reference to the attached drawings.

DESCRIPTION OF THE PREFERRED EMBODIMENTS

Figure 1:
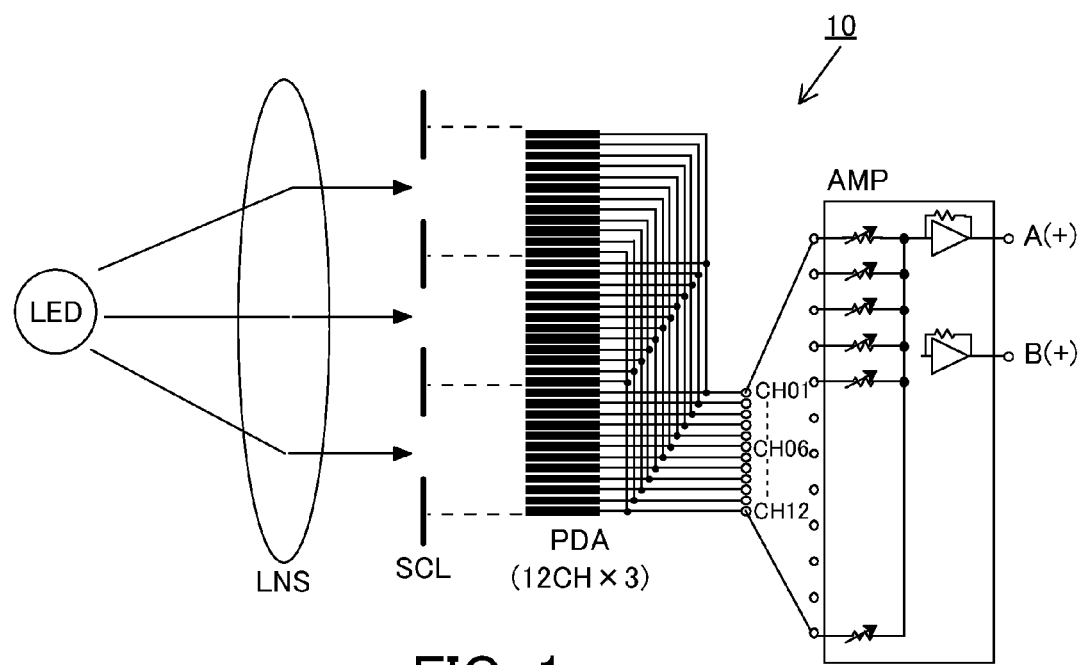
FIG. 1 is a schematic configuration diagram of an optical encoder in a first embodiment.

Exemplary embodiments of the present invention will be described below with reference to the accompanied drawings. In each of the drawings, the same elements will be denoted by the same reference numerals and the duplicate descriptions thereof will be omitted.

First Embodiment

First of all, an optical encoder in a first embodiment of the present invention will be described. FIG. 1 is a schematic configuration diagram of an optical encoder 10 (a transmission slit encoder) in the present embodiment. As illustrated in FIG. 1, in the optical encoder 10 of the present embodiment, a divergent light emitted from a point light source LED (a point source) is converted into a parallel light by a collimater lens LNS, and the parallel light illuminates a scale SCL (a grating scale) having a movable transmission slit. Then, a transmitted light that transmits through the scale SCL is received by a light-receiving element array PDA (a plurality of light-receiving elements). The light-receiving element PDA is a light-receiving element array that collects electric power of an output of each light-receiving element for every N light-receiving elements (N is an integer equal to or greater than 6, and N is equal to 12 in the present embodiment), and one pitch of the light-receiving element array PDA corresponds to one cycle of the light-and-dark distribution light.

In the present embodiment, the light-receiving element array PDA is divided into N light-receiving elements (N is equal to 12 in the present embodiment) for the transmitted light (that does not have a sine wave shape) of one light-and-dark cycle. Furthermore, the light-receiving element array PDA is configured so that a phase of a periodic signal outputted from each light-receiving element is different by 360 degrees/N from each other (30 degrees in FIG. 1). Although the transmitted light of three light-and-dark cycles are received by the light-receiving element array PDA in FIG. 1, the present embodiment is not limited to this and it may also be configured so that the transmitted light of two cycles or four cycles or more is received.

Figure 2A:
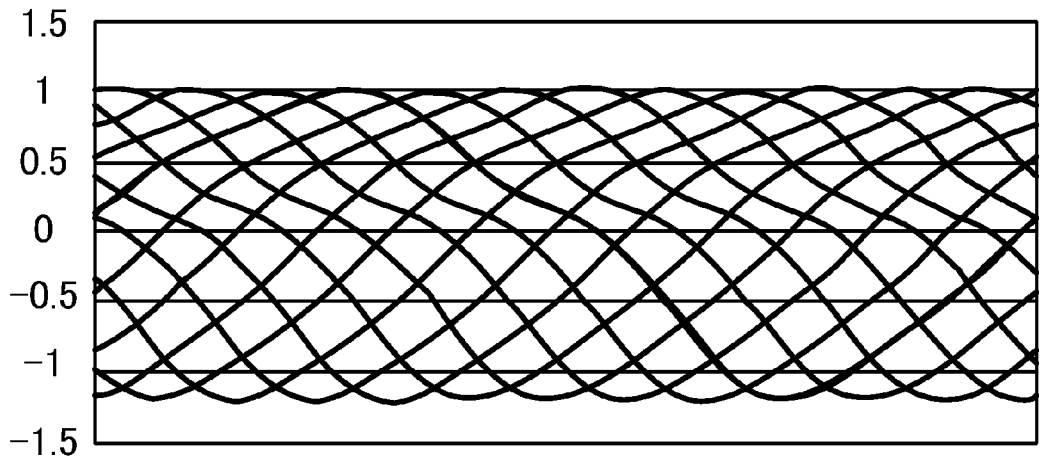
FIGS. 2A and 2B are waveform diagrams of a light-receiving element array in a first embodiment.
Figure 2B:
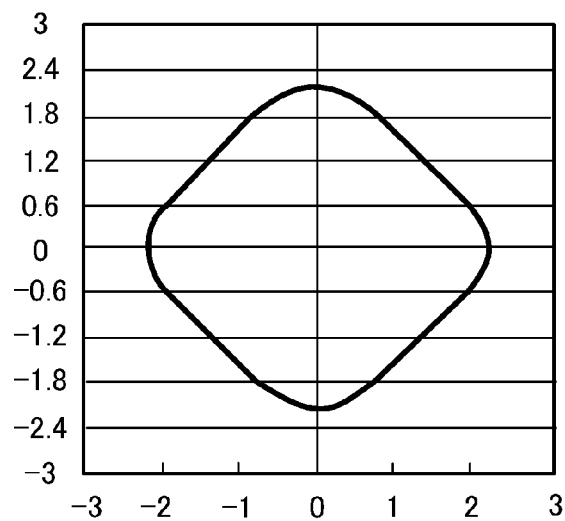

FIGS. 2A and 2B are waveform diagrams of the light-receiving element array PDA. FIG. 2A is an output waveform diagram (twelve-phase output waveforms) of the light-receiving element array PDA, and FIG. 2B is a Lissajous waveform diagram that is generated by using only four-phase output waveforms of the twelve-phase output waveforms of the light-receiving element array PDA. Thus, the output waveform of the light-receiving element array PDA does not exactly have a sine wave shape. Therefore, the Lissajous waveform generated by using only four-phase output waveforms does not exactly become a circular shape.

An amplifier AMP of the present embodiment multiplies a first coefficient set (a first amplification factor set) whose phases are different from each other by N-phase periodic signals (N is an integer equal to or greater than 6, and N is equal to 12 in the present embodiment) obtained from the light-receiving element array PDA (multiplied by the first amplification factor set). Then, the amplifier AMP generates a first phase (A phase) periodic signal having a sine waveform based on a sum of values obtained by multiplying the first coefficient set. In the present embodiment, the first coefficient set with respect to the N-phase periodic signals is for example represented as follows.

$$G1(1) = \{1 + \sin(1/N \times 2\pi)\}/2$$
$$G2(1) = \{1 + \sin(2/N \times 2\pi)\}/2$$
$$G3(1) = \{1 + \sin(2/N \times 2\pi)\}/2$$
$$\ldots$$
$$GN(1) = \{1 + \sin(N/N \times 2\pi)\}/2$$

Similarly, the amplifier AMP multiplies a second coefficient set (a second amplification factor set) whose phases are different from each other by the N-phase periodic signals (multiplied by the second amplification factor set). Then, the amplifier AMP generates a second phase (B phase) periodic signal having a sine waveform based on a sum of values obtained by multiplying the second coefficient set. In the present embodiment, the second coefficient set with respect to the N-phase periodic signals is for example represented as follows.

$$G1(2) = \{1 + \sin(1/N \times 2\pi + \pi/2)\}/2$$
$$G2(2) = \{1 + \sin(2/N \times 2\pi + \pi/2)\}/2$$
$$G3(2) = \{1 + \sin(2/N \times 2\pi + \pi/2)\}/2$$
$$\ldots$$
$$GN(2) = \{1 + \sin(N/N \times 2\pi + \pi/2)\}/2$$

Figure 3A:
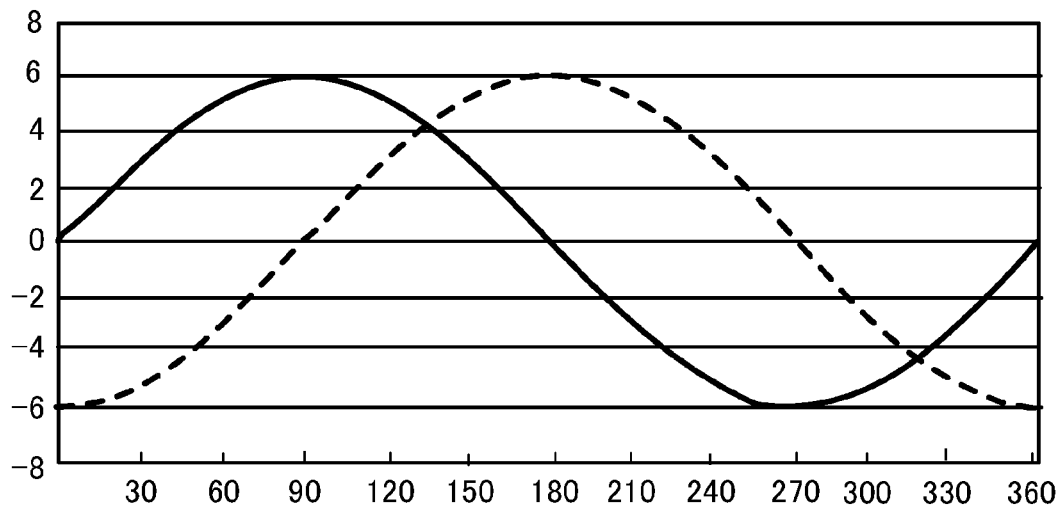
FIGS. 3A and 3B are waveform diagrams in a first embodiment.
Figure 3B:
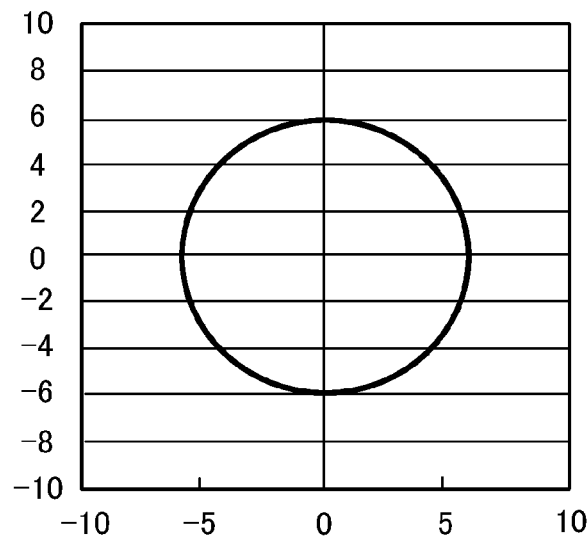

FIGS. 3A and 3B are waveform diagrams in the present embodiment. FIG. 3A is a waveform diagram of an A-phase and B-phase signals, and FIG. 3B is a Lissajous waveform diagram that is generated from the A-phase and B-phase signals. Thus, the output waveform of the amplifier AMP has a sine waveform (substantially a sine waveform), and the Lissajous waveform that is generated based on the output waveform of the amplifier AMP has a circular shape (substantially a circular shape).

Although the present embodiment uses two-phase signals of the A-phase signal and the B-phase signal, it is not limited to this and may also use three-phase signals or more. When M-phase signals (M is an integer equal to or greater than 2) is used, M coefficient sets (a k-th coefficient set) are for example represented as the following general expressions.

$$G1(k) = \{1 + \sin(1/N \times 2\pi + \pi \times (k-1)/M)]/2$$
$$G2(k) = \{1 + \sin(2/N \times 2\pi + \pi \times (k-1)/M)\}/2$$
$$G3(k) = \{1 + \sin(3/N \times 2\pi + \pi \times (k-1)/M)]/2$$
$$\ldots$$
$$GN(k) = \{1 + \sin(N/N \times 2\pi + \pi \times (k-1)/M)\}/2$$
$$(\text{where } k = 1, 2, \ldots, M)$$

In this case, the amplifier AMP multiplies the M coefficient sets (the k-th coefficient set) whose phases are different from each other by N-phase periodic signals (multiplied by the k-th amplification factor set). Then, the amplifier AMP generates M-phase (k-th phase) periodic signals having sine waveforms based on a sum of values obtained by multiplying the M coefficient sets (the k-th coefficient set).

In the present embodiment, considering a variation of sensitivity of the light-receiving element or a light intensity unevenness caused by the optical system, the value of the coefficient set described above may be changed if necessary. Furthermore, the optical encoder 10 may include an interpolation device that performs an electric interpolation process using the M-phase periodic signals having sine waveforms.

Second Embodiment

Figure 4A:
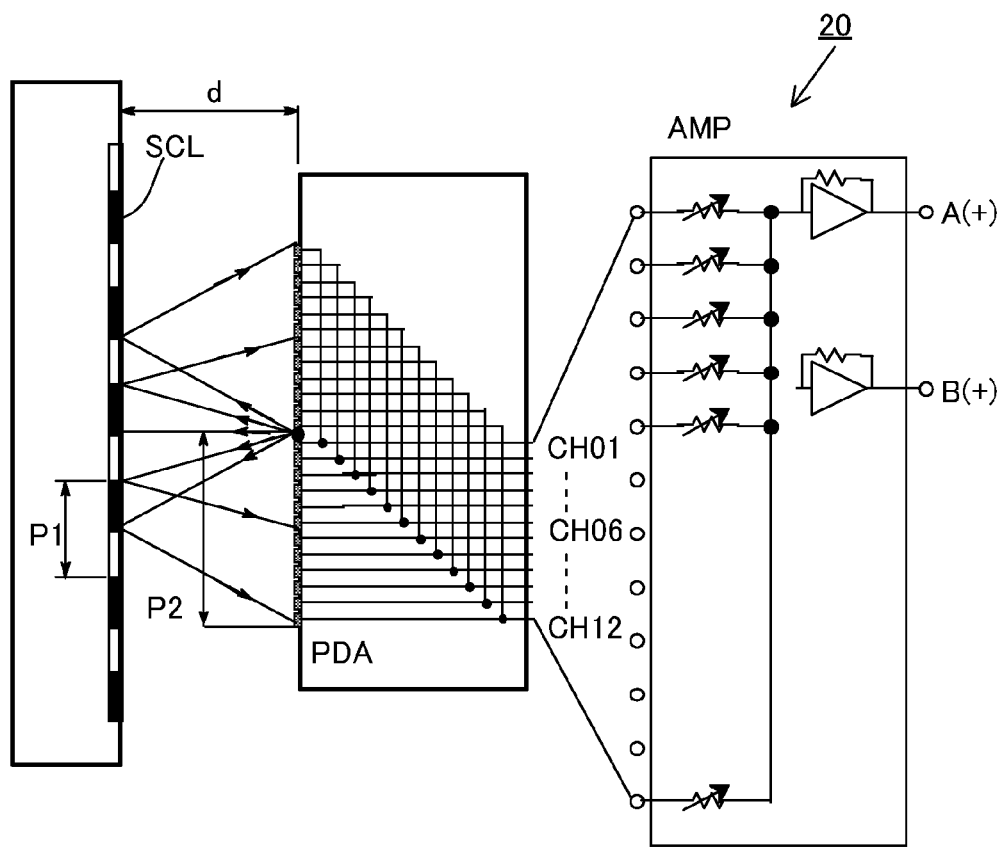
FIGS. 4A and 4B are schematic configuration diagrams of an optical encoder in a second embodiment.
Figure 4B:
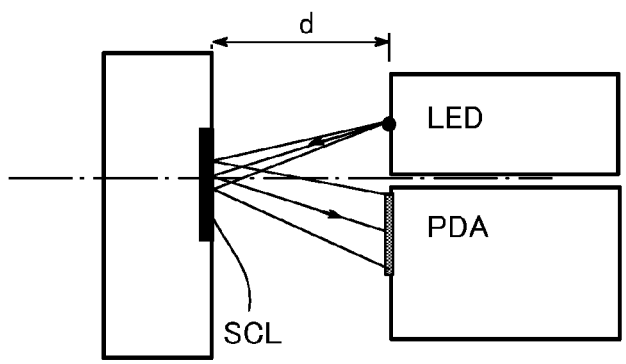

Next, an optical encoder in a second embodiment of the present invention will be described. FIGS. 4A and 4B are schematic configuration diagrams of an optical encoder 20 (a reflective slit encoder) in the present embodiment, and FIG. 4A is a front view and FIG. 4B is a bottom view. As illustrated in FIGS. 4A and 4B, the optical encoder 20 of the present embodiment obliquely illuminates a divergent light emitted from a point light source LED onto a scale SCL having a relatively-movable reflective slit that is disposed at a distance d. Then, it projects a doubled size of a light-and-dark pattern onto the light-receiving element array PDA while enlarging the reflected light.

In the present embodiment, the light-receiving element array PDA is divided into twelve light-receiving elements with respect to one light-and-dark cycle (pitch P2, and it does not have a sine waveform), and each light-receiving element is disposed so that phases of output signals are different by 30 degrees from each other. As illustrated in FIGS. 4A and 4B, when the reflected light of two light-and-dark cycles is received by the light-receiving element array PDA, a distortion component having 0.5th order of the light-and-dark signal can be effectively removed. It is preferable that the light-receiving element array PDA is configured so as to receive the reflected light of six cycles or twelve cycles that are even cycles. The signal outputted from the light-receiving element array PDA is similar to the waveform illustrated in FIG. 2A. Each of the output signals (twelve-phase signals CH01, CH02, CH03, ..., CH12) is added by two pairs of amplifiers AMP with a weight of the amplification factor of the sine wave or the cosine wave to be outputted as the A-phase signal and the B-phase signal.

Third Embodiment

Figure 5:
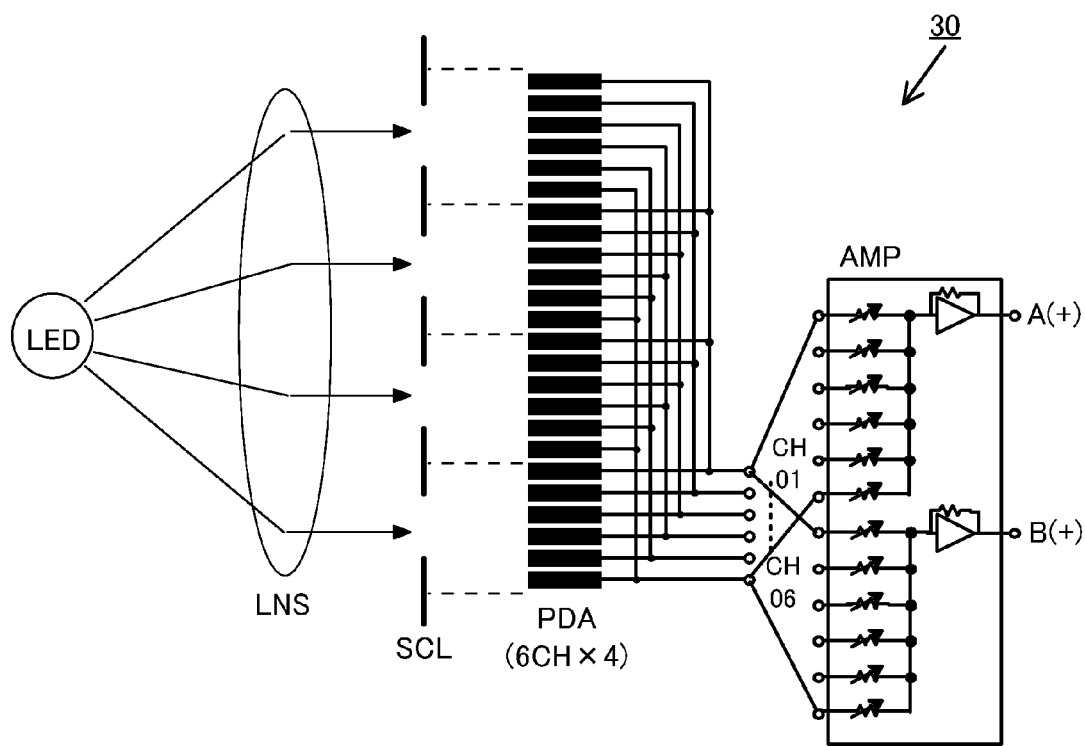
FIG. 5 is a schematic configuration diagram of an optical encoder in a third embodiment.

Next, an optical encoder in a third embodiment of the present invention will be described. FIG. 5 is a schematic configuration diagram of an optical encoder 30 (a transmission slit encoder) in the present embodiment. As illustrated in FIG. 5, the optical encoder 30 of the present embodiment converts a divergent light emitted from a point light source LED into a parallel light using a collimater lens LNS, and illuminates the parallel light onto a scale SCL having a relatively-movable transmission slit to receive a transmitted light of the scale using the light-receiving element array PDA.

The light receiving element array PDA is divided into N light-receiving elements (N is equal to 6 in the present embodiment) for the transmitted light (that does not have a sine wave shape) of one light-and-dark cycle, and is configured so that a phase of a periodic signal outputted from each light-receiving element is different by 360 degrees/N from each other (in the present embodiment, 360 degrees/6=60 degrees). Although the transmitted light of four light-and-dark cycles are received by the light-receiving element array PDA in the present embodiment, the present embodiment is not limited to this.

Figure 6A:
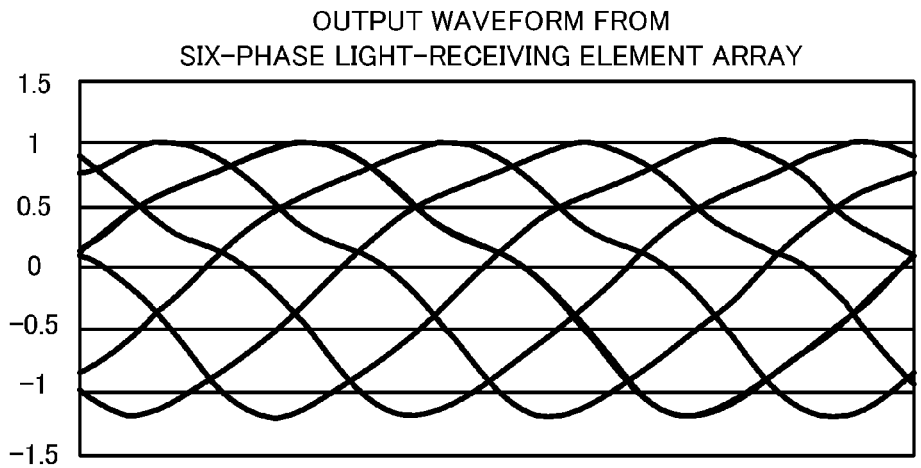
FIGS. 6A to 6C are waveform diagrams in a third embodiment.

FIG. 6A is an output waveform diagram (six-phase output waveform) of the light-receiving element array PDA. Thus, the output waveform of the light-receiving element array PDA is not exactly a sine wave shape. Therefore, the amplifier AMP of the present embodiment multiplies a first coefficient set (a first amplification factor set) whose phases are different from each other by N-phase periodic signals (N is equal to 6 in the present embodiment) obtained from the light-receiving element array PDA (multiplied by the first amplification factor set). Then, the amplifier AMP generates a first phase (A phase) periodic signal having a sine wave shape based on a sum of values obtained by multiplying the first coefficient set. In the present embodiment, the first coefficient set with respect to the N-phase periodic signals is for example represented as follows.

$$G1(1) = \{1 + \sin(1/6 \times 2\pi)\}/2$$
$$G2(1) = \{1 + \sin(2/6 \times 2\pi)\}/2$$
$$G3(1) = \{1 + \sin(3/6 \times 2\pi)\}/2$$
$$...$$
$$G6(1) = \{1 + \sin(6/6 \times 2\pi)\}/2$$

Similarly, the amplifier AMP multiplies a second coefficient set (a second amplification factor set) whose phases are different from each other by the N-phase periodic signals (multiplied by the second amplification factor set). Then, the amplifier AMP generates a second phase (B phase) periodic signal having a sine wave shape based on a sum of values obtained by multiplying the second coefficient set. In the present embodiment, the second coefficient set with respect to the N-phase periodic signals is for example represented as follows.

$$G1(2) = \{1 + \sin(1/6 \times 2\pi + \pi/2)\}/2$$
$$G2(2) = \{1 + \sin(2/6 \times 2\pi + \pi/2)\}/2$$
$$G3(2) = \{1 + \sin(3/6 \times 2\pi + \pi/2)\}/2$$
$$...$$
$$G6(2) = \{1 + \sin(6/6 \times 2\pi + \pi/2)\}/2$$

Figure 6B:
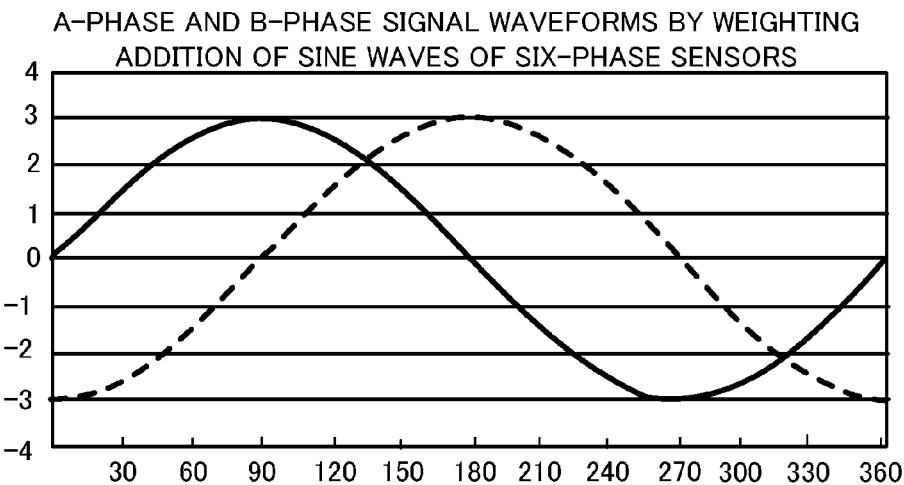
Figure 6C:
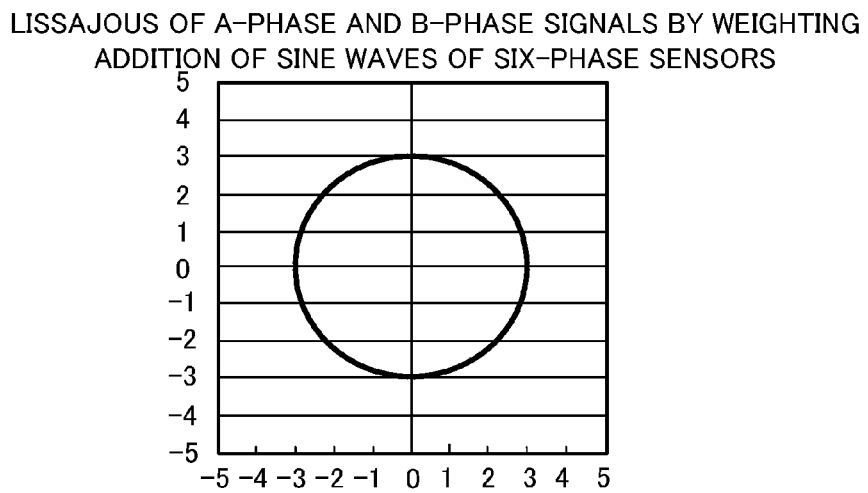

FIG. 6B is a waveform diagram of A-phase and B-phase signals, and FIG. 6C is a diagram of a Lissajous waveform that is generated from the A-phase and B-phase signals. Thus, the output waveform of the amplifier AMP has a sine wave shape (substantially a sine wave shape), and the Lissajous waveform that is generated based on the output waveform of the amplifier AMP has a circular shape (substantially a circular shape). Although the present embodiment uses two-phase signals of the A-phase signal and the B-phase signal, it is not limited to this and may also use three-phase signals or more as described in the first embodiment.

Fourth Embodiment

Figure 7:
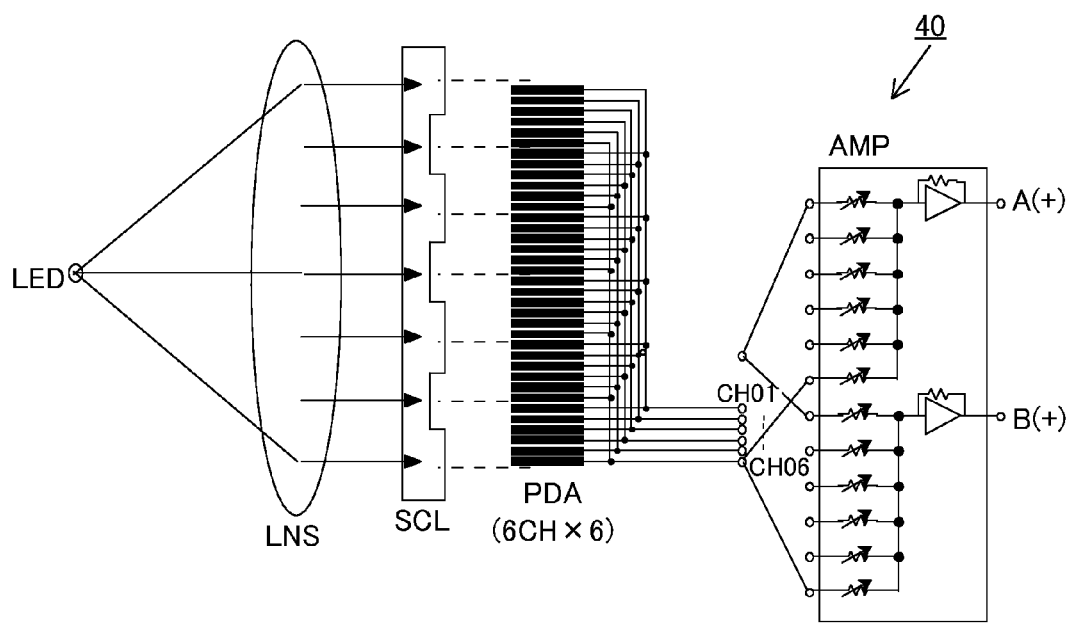
FIG. 7 is a schematic configuration diagram of an optical encoder in a fourth embodiment.

Next, an optical encoder in a fourth embodiment of the present invention will be described. FIG. 7 is a schematic configuration diagram of an optical encoder 40 (an interference fringe projection encoder) in the present embodiment. The principle of this optical system is disclosed in Japanese Patent Laid-Open No. H08-226804. The optical system adopts a method of generating a light-and-dark pattern having a pitch that is half of a pitch of a concavo-convex grating in a specific space by a light transmitting through a scale having the concavo-convex grating to detect it using a light-receiving element array.

The optical encoder 40 of the present embodiment is provided with six six-phase light-receiving element arrays PDA, each of which is positioned at ½ pitch of the light-and-dark pattern, and adds output signals of the six light-receiving element arrays PDA. The six-phase signals CH1, CH2, CH3, ..., CH6 are added after being weighted by a gain (an amplification factor) of a sine wave shape or a cosine wave shape using respective two pairs of amplifiers AMP in accordance with the same method as that of the above embodiment, and then they are outputted as A-phase and B-phase signals. Since the ½ light-and-dark projection pattern by the concavo-convex grating has a lot of distortion, the configuration of the present embodiment is particularly effective. Furthermore, the present embodiment can be widely applied to a Talbot interference fringe projection type encoder or an encoder optical system adopting a method of projecting a deformed light-and-dark pattern onto a light-receiving element array, instead of the concavo-convex grating.

Fifth Embodiment

Figure 8A:
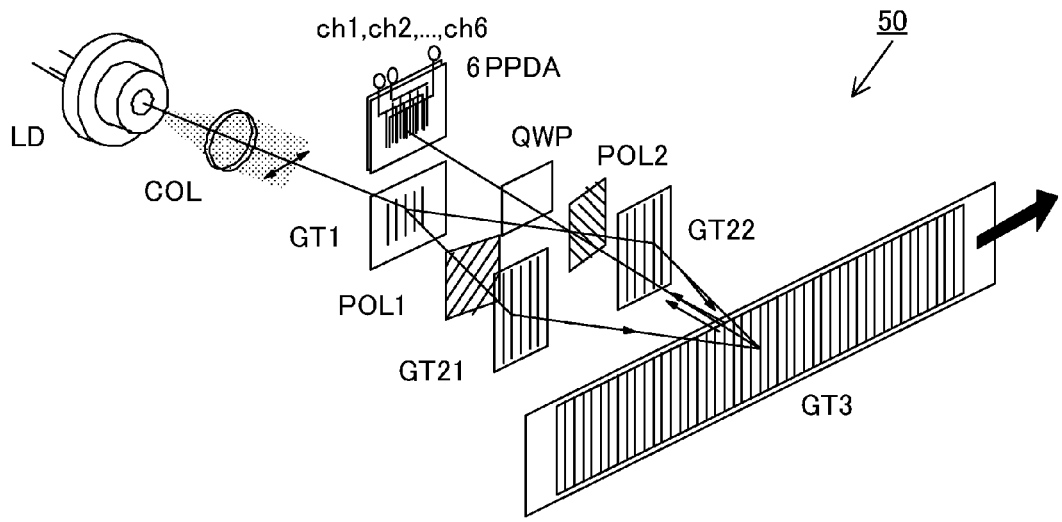
FIGS. 8A and 8B are configuration diagrams of a diffraction interference encoder in a fifth embodiment.
Figure 8B:
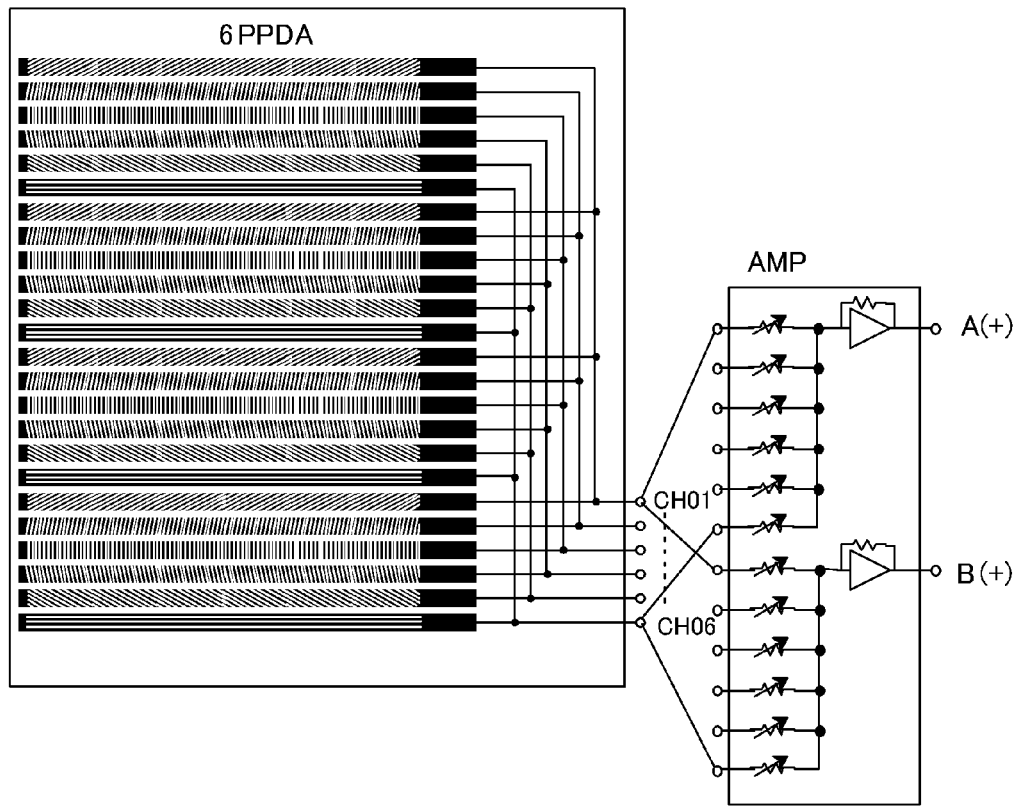

Next, an optical encoder in a fifth embodiment of the present invention will be described. FIGS. 8A and 8B are configuration diagrams of an optical encoder 50 (a diffraction interference encoder) in the present embodiment, and specifically, FIG. 8A is an overall configuration diagram of the optical encoder and FIG. 8B is a diagram of a detail of a light-receiving element array AMP along with an explanation of the weight addition of signals. The optical encoder 50 generates two-phase or four-phase phase difference signal lights by the interference of ±1st-order diffracted lights generated by a scale diffraction grating using an optical unit and by providing a polarization difference in realizing uniform interference light of so-called one color (a mono color). Then, the generated phase difference signal light is received by the two-phase or four-phase light-receiving element array PDA.

A divergent light emitted form a laser light source LD (a linear polarized light in a 0-degree direction) is converted into a parallel light by a collimater lens COL, and it is divided into two lights by a first diffraction grating GT1 (a grating pitch=P1). The divided lights transmit through a polarized plate POL1 or POL2 whose transmission axis is set to 45 degrees and −45 degrees, and are deflected by a second diffraction grating GT21 or GT22 (a grating pitch=P2). Then, they are illuminated on a diffraction grating GT3 (a grating pitch=P3) on a scale SCL that relatively moves, and ±1st-order diffracted lights are combined at the same axis and are emitted in a direction slightly different from the light source side. Because the lights combined at the same axis having linear polarizing axes different by 90 degrees from each other, they are circular polarized lights whose polarization planes rotate in opposite directions different from each other after transmitting through a quarter-wave plate QWP, and they are converted into a single linear polarized light by performing a composition of vectors. The single linear polarized light has a characteristic that its linear polarization plane rotates by half while the diffraction grating GT3 on the relatively-movable scale moves by one pitch.

The light-receiving element array PDA has 660 light-receiving surfaces each having a reed shape of a width of 12 µm and a length of 2000 µm at 15 µm intervals, and is configured to be electrically connected with electrodes each of which is common for the six light-receiving surfaces so as to output six channel photocurrents.

In front of the light-receiving surfaces of the light-receiving element array PDA, 660 polarization element patterns such as wire grid polarization elements are arrayed in a region of a reed shape having a width of 12 µm and a length of 2000 µm at 15 µm intervals. Furthermore, a six-channel polarization element array plate that is formed by changing grating directions of the wire grid polarization plate into 0, 30, 60, 90, 120, and 150 degrees for every six patterns is inserted, and it is combined so as to overlap with each region having the reed shape of the light-receiving element array. In the present embodiment, it is referred to as a "six-channel polarization light-receiving unit 6PPDA".

When the linear polarized light that changes the direction of the polarization plane in accordance with the movement of the scale is obtained by the grating interference encoder optical system described above to enter the six-channel polarization light-receiving unit 6PPDA, it is illuminated as a substantially-uniform linear polarized light in which a direction of the linear polarization rotates along with the movement of the scale. Therefore, six-phase sine wave signals (in which a distortion has been slightly added) are obtained from output terminals.

These six-phase signals ch1, ch2, ch3, . . . , ch6 are added after being weighted by a gain of a sine wave shape or a cosine wave shape using respective two pairs of amplifiers AMP, and they are outputted as A-phase and B-phase signals. In the configuration, the distortion contained in the original signal is removed. The 6-phase signals can also be configured by arranging a plurality of light-receiving elements instead of the light-receiving element array PDA.

The light-receiving element array PDA can also be configured so as to output eight-phase signals instead of the six-phase signals. In this case, adjacent polarizing transmission axes of the polarization element array in front of the light-receiving element array PDA may be different by 22.5 degrees from each other and electric power may be collected to electrodes for every eight channels. These eight-phase channels ch1, ch2, ch3, . . . , ch8 are added after being weighted by a gain of a sine wave shape or a cosine wave shape using respective two pairs of amplifiers AMP, and they are outputted as A-phase and B-phase signals. It is particularly effective because distortions of 0.5th, 2th, and 4th order components easily appear in the grating interference method.

The configuration of a slit transmission/reflection encoder having a system of detecting a plurality of phase difference signals to combine the two phases in each embodiment can realize a high-precision encoder that does not generate a distortion of a sine wave signal even if for example the position of the scale changes and the gap varies. If it is applied to a laser interferometer or a grating interference encoder, the generation of the measurement error caused by the variation of the sine wave distortion in accordance with the variation of a stray light state caused by a position change of a mirror or a scale is prevented, and therefore a high-precision interference measurement apparatus can be provided. In this case, the interference measurement apparatus includes a light-receiving element array PDA that performs a photoelectric conversion of an interference signal obtained by the interference of a reflected light or a transmitted light of a light illuminated onto movable reflecting surface or transmissive object and another light to generate N-phase periodic signals whose phase differences are different from each other. According to each of the above embodiments, high-precision optical encoder and interference measurement apparatus can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Particularly, a unit that performs an addition along with weighting the gain of the sine wave shape or the cosine wave shape may also be realized by a digital processing circuit having the same function instead of an operational amplifier. The present invention can also be applied to a two-phase signal generation unit with a low distortion in a Michelson laser interference measurement apparatus or a common interference optical apparatus.

This application claims the benefit of Japanese Patent Application No. 2010-052652, filed on Mar. 10, 2010, which is hereby incorporated by reference herein in its entirety.

What is claimed is:
1. An optical encoder comprising:
a grating scale configured to be movable;
a light-receiving device configured to receive light via the grating scale irradiated with light, to generate N-phase signals that have respective phases different from each other, where N is an integer not smaller than 6; and
an amplifier configured to:
multiply the generated N-phase signals by M coefficient sets that are different from each other, where M is an integer not smaller than 2; and
obtain a sum of the multiplied values with respect to each of the M coefficient sets to generate M-phase signals,
wherein the M coefficient sets are represented by following expressions:

$$G1(k) = \{1 + \sin(1/N \times 2\pi + \pi \times (k-1)/M)\}/2,$$
$$G2(k) = \{1 + \sin(2/N \times 2\pi + \pi \times (k-1)/M)\}/2,$$
$$G3(k) = \{1 + \sin(3/N \times 2\pi + \pi \times (k-1)/M)\}/2,$$
$$\ldots$$
$$GN(k) = \{1 + \sin(N/N \times 2\pi + \pi \times (k-1)/M)\}/2,$$
$$\text{where } k = 1, 2, \ldots, M.$$

2. The optical encoder according to claim 1, further comprising an interpolation device configured to perform an interpolation process using the generated M-phase signals.

3. The optical encoder according to claim 1, wherein:
the light-receiving device includes light-receiving elements, and
the light-receiving device is configured to generate each of the N-phase signals based on outputs of two light-receiving elements that are away from each other by N light-receiving elements and away from each other by one cycle of an intensity distribution of light to be received by the light-receiving device.

4. The optical encoder according to claim 1, wherein the light-receiving device is configured to receive a light obtained by an interference between lights via the grating scale.

5. An optical encoder comprising:
a grating scale;
a light-receiving device configured to receive light via the grating scale irradiated with light, to generate N-phase signals that have respective phases different from each other, where N is an integer not smaller than 6; and
a device configured to:
multiply the generated N-phase signals by M coefficient sets, each including N coefficients for reducing harmonic components and an offset component of the N-phase signals that are different from each other, where M is an integer not smaller than 3; and
obtain a sum of the multiplied values with respect to each of the M coefficient sets to generate M-phase signals.

6. The optical encoder according to claim 5, wherein the M coefficient sets are represented by following expressions:

$$G1(k) = \{1 + \sin(1/N \times 2\pi + \pi \times (k-1)/M)\}/2,$$
$$G2(k) = \{1 + \sin(2/N \times 2\pi + \pi \times (k-1)/M)\}/2,$$
$$G3(k) = \{1 + \sin(3/N \times 2\pi + \pi \times (k-1)/M)\}/2,$$
$$\ldots$$
$$GN(k) = \{1 + \sin(N/N \times 2\pi + \pi \times (k-1)/M)\}/2,$$
$$\text{where } k = 1, 2, \ldots, M.$$

7. The optical encoder according to claim 5, further comprising an interpolation device configured to perform an interpolation process using the generated M-phase signals.

8. The optical encoder according to claim 5, wherein:
the light-receiving device includes light-receiving elements, and
the light-receiving device is configured to generate each of the N-phase signals based on outputs of two light-receiving elements that are away from each other by N light-receiving elements in the light-receiving elements and away from each other by one cycle of an intensity distribution of light to be received by the light-receiving device.

9. The optical encoder according to claim 5, wherein the light-receiving device is configured to receive light obtained by an interference between lights generated by the grating scale.

10. An interferometer comprising:
a light-receiving device configured to receive interference light, obtained by an interference between first light via a movable surface and second light, to generate N-phase signals that have respective phases different from each other, where N is an integer not smaller than 6; and
a device configured to:
multiply the generated N-phase signals by M coefficient sets, each including N coefficients for reducing harmonic components and an offset component of the N-phase signals that are different from each other, where M is an integer not smaller than 3; and
obtain a sum of the multiplied values with respect to each of the M coefficient sets to generate M-phase signals.

11. An encoder comprising:
a grating scale;
a receiving device configured to receive a signal via the grating scale to generate N-phase signals that have respective phases different from each other, where N is an integer not smaller than 6; and
a device configured to:
multiply the generated N-phase signals by M coefficient sets that are different from each other, where M is an integer not smaller than 2; and
obtain a sum of the multiplied values with respect to each of the M coefficient sets to generate M-phase signals,
wherein the M coefficient sets are represented by following expressions:

$$G1(k) = \{1 + \sin(1/N \times 2\pi + \pi \times (k-1)/M)\}/2,$$
$$G2(k) = \{1 + \sin(2/N \times 2\pi + \pi \times (k-1)/M)\}/2,$$
$$G3(k) = \{1 + \sin(3/N \times 2\pi + \pi \times (k-1)/M)\}/2,$$
$$\ldots$$
$$GN(k) = \{1 + \sin(N/N \times 2\pi + \pi \times (k-1)/M)\}/2,$$
$$\text{where } k = 1, 2, \ldots, M.$$

12. The encoder according to claim 11, further comprising an interpolation device configured to perform an interpolation process using the generated M-phase signals.

13. The encoder according to claim 11, wherein:
the receiving device includes receiving elements, and
the receiving device is configured to generate each of the N-phase signals based on outputs of two receiving elements that are away from each other by N light-receiving elements in the receiving elements and away from each other by one cycle of an intensity distribution of the signal to be received by the receiving device.

14. An encoder comprising:
a grating scale;
a receiving device configured to receive a signal via the grating scale to generate N-phase signals that have respective phases different from each other, where N is an integer not smaller than 6; and a device configured to:
multiply the generated N-phase signals by M coefficient sets, each including N coefficients for reducing harmonic components and an offset component of the N-phase signals that are different from each other, where M is an integer not smaller than 3; and
obtain a sum of the multiplied values with respect to each of the M coefficient sets to generate M-phase signals.

15. The according to claim 14, wherein the M coefficient sets are represented by following expressions:

$$G1(k) = \{1 + \sin(1/N \times 2\pi + \pi \times (k-1)/M)]/2,$$
$$G2(k) = \{1 + \sin(2/N \times 2\pi + \pi \times (k-1)/M)\}/2,$$
$$G3(k) = \{1 + \sin(3/N \times 2\pi + \pi \times (k-1)/M)]/2,$$
$$\dots$$

-continued
$$GN(k) = \{1 + \sin(N/N \times 2\pi + \pi \times (k-1)/M)\}/2,$$
where $k = 1, 2, \dots, M$.

16. The encoder according to claim 14, further comprising an interpolation device configured to perform an interpolation process using the generated M-phase signals.

17. The encoder according to claim 14, wherein:
the receiving device includes receiving elements, and
the receiving device is configured to generate each of the N-phase signals based on outputs of two receiving elements that are away from each other by N light-receiving elements in the receiving elements and away from each other by one cycle of an intensity distribution of the signal to be received by the receiving device.

* * * * *